Sept. 15, 1931.   R. F. BURGESS   1,823,783
LUGGAGE CARRIER FOR AUTOMOBILES
Filed May 3, 1929   2 Sheets-Sheet 1

Inventor,
Robert F. Burgess
Ernest E. Weaver
Atty.

Sept. 15, 1931.  R. F. BURGESS  1,823,783
LUGGAGE CARRIER FOR AUTOMOBILES
Filed May 3, 1929    2 Sheets-Sheet 2
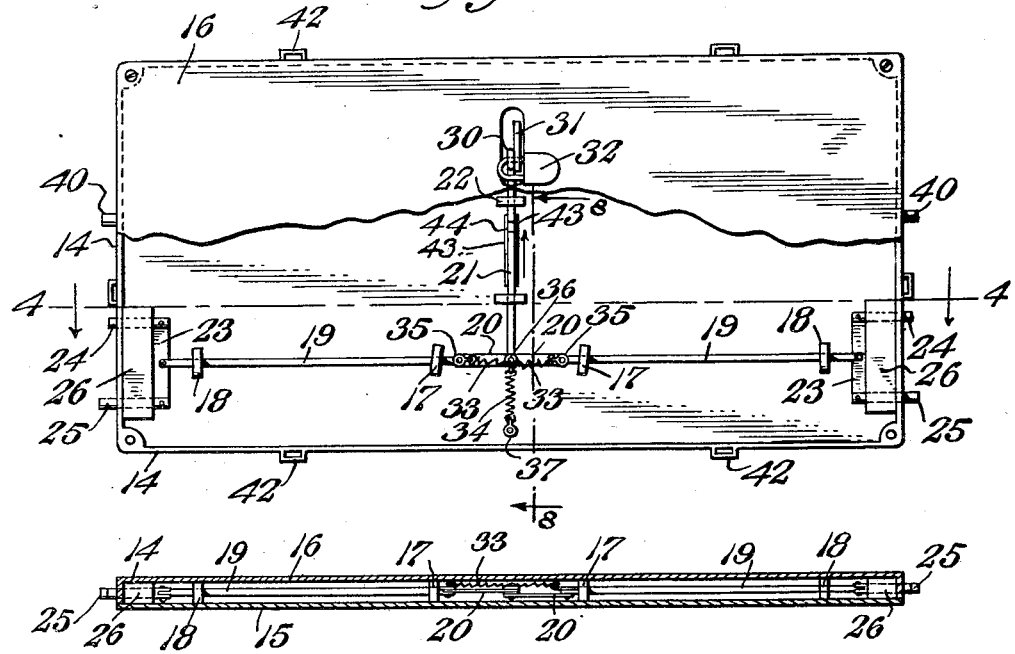
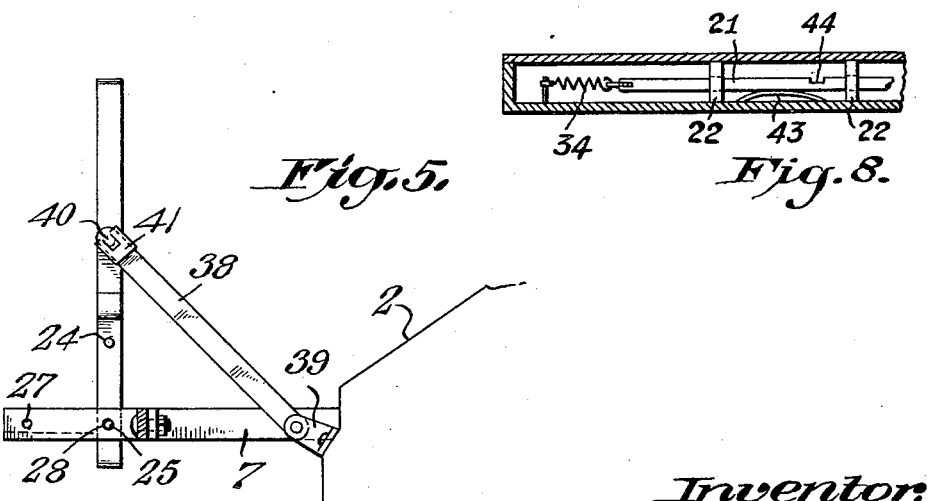

Patented Sept. 15, 1931

1,823,783

UNITED STATES PATENT OFFICE

ROBERT F. BURGESS, OF WASHINGTON, DISTRICT OF COLUMBIA

LUGGAGE CARRIER FOR AUTOMOBILES

Application filed May 3, 1929. Serial No. 360,084.

This invention relates to luggage carriers for automobiles, of the type which is mounted upon the rear of the vehicle adjacent the bumpers, and while shown as associated with bumpers of the character commonly known as "wing" bumpers, may as readily be employed with what is known as the "bar" type.

It is well known, that in carriers of the usual character, where said carrier is mounted on or associated with bumpers on automobiles, it is a source of considerable annoyance and inconvenience for the operator of the vehicle to remove the spare tire, since the carrier extends over the spare tire and obstructs the removal thereof. With my form of carrier, all that is necessary, is for the operator to retract the locking mechanism, and the carrier may then be lifted bodily as a unit from the supporting brackets, affording ready access to the spare tire.

In all the luggage carriers of which I have knowledge, none of them is removable, by the manual operation of a locking mechanism, operated by simply pulling a handle. In all those prior devices with which I am acquainted, it is necessary to resort to tools such as wrenches, screw-drivers or pliers, to remove the carrier, and in such instances, the structure is necessarily disassociated or taken to pieces, part by part. In my carrier, the structure is removed as a unit, without the use or need of any tools whatever, the invention being designed to produce a readily removable device, capable of operation by even a child or woman.

It is therefore, the principal object of my invention to produce a readily removable or detachable luggage carrier which, through the medium of a simple hand operated locking mechanism, may be mounted upon or detached from cooperating brackets secured upon the rear of the vehicle.

It is a further object of my invention, to produce a luggage carrier, provided with a double locking mechanism, serving a two-fold function, the first of which is to provide a pivoting mechanism upon which the carrier may be swung from lowered or load carrying position to an upright position, and the second of which is to provide a simple locking mechanism whereby the carrier is locked when in lowered or load carrying position, against removal from the brackets, or into an upright or vertical position.

One of the additional features of my invention, is that the carrier performs the function of a tire lock, or anti-theft device, in that it extends across the tire and forms a barrier, preventing its removal without first removing the carrier.

In the accompanying drawings, forming a part of this specification,

Figure 3 is a plan view of the carrier, with parts broken away, to show the operating mechanism;

Figure 4 is a longitudinal sectional view of the carrier, taken on the lines 4—4 of Figure 3 and looking in the direction of the arrows;

Figure 5 is a side elevation of the carrier in position on the supporting brackets, and showing it raised into a vertical plane;

Figure 8 is a cross section of the device, taken on the line 8—8 of Figure 3.

Figure 1:
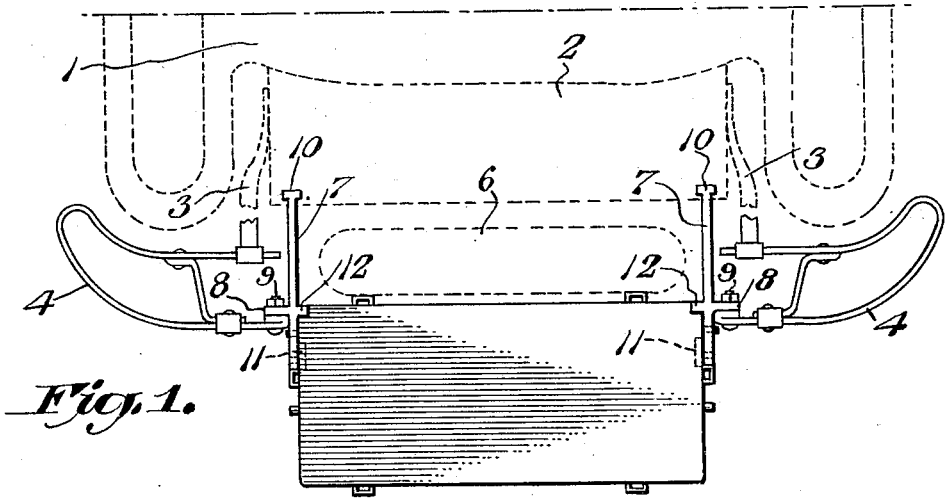
Figure 1 is a plan view of the rear portion of an automobile, showing my carrier applied to its supporting means.

Referring now to the drawings by reference numerals, 1 indicates in outline, the rear portion of an automobile, including the fuel tank protecting plate or bib 2, and the rear bumper supporting brackets 3, the latter being secured to the frame of the vehicle in the usual manner, and in turn supporting the wing bumpers 4. The spare tire, indicated in outline by the numeral 6, is mounted in the ordinary manner upon its support on the rear of the vehicle, between the bumpers 4.

Extending rearwardly and horizontally from the vehicle, are a pair of spaced luggage carrier supporting brackets 7, said brackets each having an intermediate laterally and outwardly extending ear 8, through the medium of which it is connected by a bolt and nut arrangement 9, with the inner end of the bumper, the inner end of each bracket terminating in a foot 10, through which it is connected by bolts or rivets with the bib 2, this affording a rigid support for the luggage carrier to be hereinafter described. At a point along its lower edge, and forward of its connection with the bumper, each bracket is provided with an inwardly extending ledge 11, while at a point substantially adjacent its connection with the bumper, and along its upper edge, said bracket is provided with an inwardly extending lug 12, for purposes to be later described.

The luggage carrier or platform, shown more in detail in Figs. 3, 4, 6 and 7, comprises a rectangular metal frame 14, to the opposite sides of which are secured metallic plates 15 and 16, constituting respectively, the upper and lower faces of the carrier, and while these are shown as solid plates, they may as readily be provided with any form of openings which will lighten the carrier.

Referring now to Figure 3, it will be noted that the upper plate is provided on its inner face with a series of guide lugs or bearings 17 and 18, in which are mounted for sliding movement, a pair of longitudinal reciprocatory rods 19, the inner ends of which, through the medium of links 20, are connected with a slidable operating rod 21, mounted in bearing lugs 22, also arranged on the inner face of the upper plate 15, the slidable operating rod 21, being arranged transversely of the luggage carrier, and at right angles to the rods 19.

At its outer end, each of the rods 19 is provided with a plate 23, having a pair of bolts 24 and 25 respectively, arranged parallel with the rods 19, said bolts being slidable in openings in bearing blocks 26 mounted on the inner face of the side portions of the metal frame 14, and being adapted to be projected through apertures in said frame, in registry with the openings 27 and 28 respectively in the bearing blocks 26. The bolts 25, which I will hereafter refer to as the primary bolts, serve a two-fold function, the first being that of a pivoting means for the luggage carrier, while the second is that of a locking means therefor; the bolts 24, which may be termed secondary locking bolts, serving solely the purpose of locking the carrier in operative position against removal until the mechanism is unlocked to release said carrier.

The operating rod 21 is provided at its free end, with a laterally extending handle 30, having an opening therein which is adapted to be brought into registry with an eye in a lug 31, the latter fixed on the inner face of the top plate 15, for the purpose of receiving a padlock or other fastening device 32.

Figure 7:
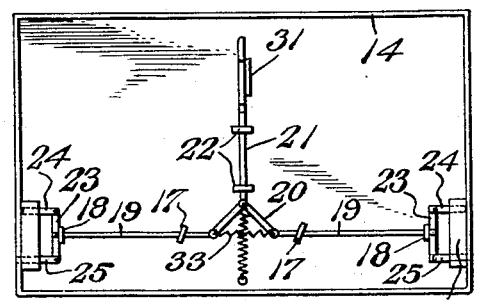

The locking mechanism, shown in normal locking position in Fig. 3, is released or retracted by sliding the operating rod 21 transversely of the carrier in the direction of the arrow by the handle 30 being assisted at this time by a tension spring 33 which is under tension as shown in Figure 3, the spring being connected at its ends with pins 35 on the inner ends of rods 19. A tension coil spring 34 connected at its lower end with a fixed pin 37 on the carrier plate 15 and at its upper end with a pin 36 on the lower end of the operating rod 21 is, in the position shown in Figure 3, relaxed, and does not become tensioned until the operating parts are substantially in the position shown in Figure 7, wherein the spring 33 is substantially relaxed and a spring 34 placed under a slight tension. As shown in Figure 7, the spring 34 is in a position to initiate the movement of the rods 19 to project the bolts 24 and 25.

For the purpose of retaining the carrier when in elevated position shown in Fig. 5, I provide an arm 38 pivoted upon bracket 39 secured to the bib 2, said arm having a fastening device 41 at its upper end which cooperates with a stud 40 arranged upon the side of the carrier frame. The carrier is also provided with luggage strap loops 42.

In the operation of the carrier, and assuming that the carrier is removed from the supporting brackets, and the movable elements including the operating rod 21, reciprocatory rods 19, and the two sets of bolts 24 and 25 in the position shown in Fig. 3; the operator, after the lock is removed, by pulling the operating rod 21 in the direction of the arrow, retracts said bolts 24 and 25, so that they are in the position shown in Fig. 7. The operator then, while holding the carrier so that the bottom plate 16 is first directed rearwardly of the automobile, places the carrier between the brackets 7, in such position that the primary bolts 25 and secondary bolts 24 register with the openings 28 and 27 respectively in the brackets 7, at which time the operating rod is released and the operator, with the assistance of the tension springs 33 and 34, moves the rods 19 to project said primary and secondary bolts into their respective registering openings.

At this time, the rear corners of the carrier will be disposed beneath the lugs 12, while the intermediate side edges will rest upon the ledges 11. The lock 32 may now be placed through the registering openings in the operating handle and the lug 31, and in which position it will be impossible to retract the bolts and remove the carrier from the brackets. To entirely remove the carrier from the brackets 7, a reversal of the mechanism as described, retracts the bolts 24 and 25.

Figure 2:
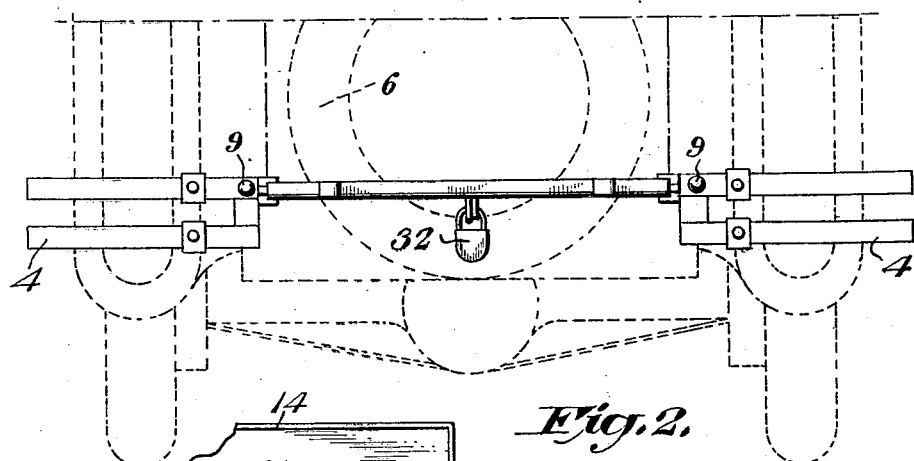
Figure 2 is a rear view of an automobile, and showing my carrier mounted in position and in lowered or load carrying position.
Figure 6:
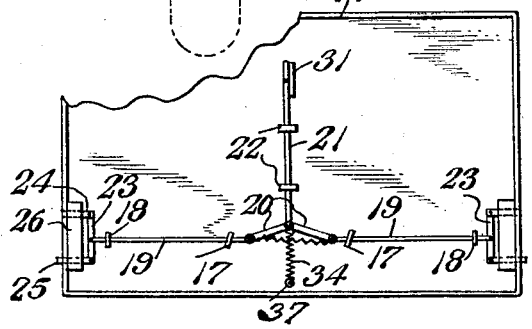
Figures 6 and 7 are plan views of the carrier with one of the cover plates removed, and showing the operating mechanism in partially and entirely unlocked position respectively.

On the other hand, should the operator desire to move the carrier from its load carrying position shown in Figs. 1 and 2, to the position shown in Fig. 5, the operator moves the operating rod in the direction of the arrow until a leaf spring 43 beneath the rod 21, forces the notched portion 44 into the upper lug 22, when he will know that the secondary bolts 24 have been retracted from their openings 27 in the said brackets 7. The carrier may then be swung on the primary bolts 25, acting as pivots or bearings, into an upright position as shown in Fig. 5. The fastening device 41 on the pivoted arm 38 will now engage the stud 40 on the side of the frame of the carrier and maintain it in such upright position.

Having thus described my invention, what I claim as new and desire to protect by Letters Patent is:

1. A detachable luggage carrier, comprising a frame having a face plate, a pair of oppositely movable rods each having a pair of bolts at its outer end adapted to be extended beyond the sides of the frame, and means for simultaneously projecting and retracting said bolts.

2. A detachable luggage carrier, comprising a frame having a face plate, a pair of oppositely movable rods slidable on said face plate, a pair of bolts carried at the outer end of each of said rods and adapted to be projected beyond the sides of the frame, said bolts being of different lengths, the longer of said bolts serving as a pivotal supporting means for said frame on a vehicle part, and the shorter of said bolts serving as a locking means for the frame on a vehicle part, and means for manually retracting and projecting said bolts.

3. In a luggage carrier, a frame having a plate, a pair of reciprocatory rods mounted in bearings on said plate, a bar carried at the outer end of each of said rods, a pivot bolt carried by said bar, a locking bolt also carried by said bar and spaced therefrom, and shorter than said first bolt, an operating rod, means for connecting said operating rod with said reciprocatory rods, and means for locking said operating rod in fixed position when said pivot and locking bolts are moved into advanced position.

4. In a device of the class described, adapted to be mounted upon supporting brackets at the rear of the vehicle, comprising a frame having a pair of spaced plates, a pair of reciprocatory rods mounted upon one of said plates and oppositely movable, a pair of bolts connected with the outer end of each of said rods, one of said bolts of each pair serving as a combined lock and pivotal support for said frame, means for projecting and retracting said bolts, and means for locking said bolts in projected position.

5. In a luggage carrier adapted to be detachably mounted upon supporting brackets at the rear of the vehicle, comprising a frame having a pair of spaced plates, a pair of reciprocatory rods mounted on one of said plates, a pair of bolts connected with the outer end of each of said rods, the side members of said frame having openings to permit the passage of the bolts therethrough, one of said bolts of each pair being relatively shorter than the other, to provide respectively, a locking and a supporting means, an operating rod also mounted upon the plate carrying the reciprocatory rods and arranged at right angles to the latter, cooperating locking means carried respectively by said operating rod and a fixed part of one of said plates for securing said bolt operating mechanism in locked or unlocked position, and spring means connected with said reciprocatory rods and said operating rod for assisting the operation of said mechanism into locking position.

6. In a luggage carrier, supporting means adapted to be mounted upon a vehicle, a luggage carrier adapted to be mounted upon said supporting means, means for pivotally connecting said carrier and supporting means, means for locking said carrier against pivotal movement, and a unitary means for controlling said locking means and for releasing and connecting said pivotal connecting means.

7. In a luggage carrier, supporting means adapted to be mounted upon a vehicle, a luggage carried adapted to be mounted upon said supporting means, means upon each side of said carrier for pivotally connecting said carrier and said supporting means, means upon each side of said carrier for locking said carrier against pivotal movement, and a unitary means for controlling said locking means and for releasing and connecting said pivotal connecting means.

8. In a luggage carrier, a supporting means adapted to be mounted upon a vehicle, a luggage carrier adapted to be mounted upon said supporting means, means upon each side of said carrier for pivotally connecting said carrier and supporting means, additional means upon each side of said carrier for locking said carrier against pivotal movement, and means for simultaneously controlling said locking means and for releasing or connecting said pivotal connecting means upon each side of said carrier.

9. A detachable luggage carrier comprising in combination with a vehicle, supporting brackets mounted upon said vehicle, and provided with bolt receiving recesses, a luggage carrier platform comprising a plate having a pair of oppositely movable pivot bolts, each adapted to be moved into one of three positions, means for simultaneously retracting or projecting said bolts and means for locking said bolts in two of said three positions.

In testimony whereof I affix my signature.

ROBERT F. BURGESS.